(12) United States Patent
Bailey

(10) Patent No.: US 7,877,287 B1
(45) Date of Patent: Jan. 25, 2011

(54) SYSTEM AND METHOD FOR SELECTING MULTIPLE SITES USING WEIGHTED BANDS

(76) Inventor: G. William Bailey, 16 Fairfield Dr., Newark, DE (US) 19711

( * ) Notice: Subject to any disclaimer, the term of this patent is extended or adjusted under 35 U.S.C. 154(b) by 154 days.

(21) Appl. No.: 12/213,343

(22) Filed: Jun. 18, 2008

Related U.S. Application Data

(60) Division of application No. 09/953,156, filed on Sep. 17, 2001, now Pat. No. 7,412,398, which is a continuation-in-part of application No. 09/095,802, filed on Jun. 11, 1998, now Pat. No. 6,604,083.

(60) Provisional application No. 60/049,448, filed on Jun. 12, 1997.

(51) Int. Cl.
*G06F 17/30* (2006.01)
(52) U.S. Cl. .................................. 705/10
(58) Field of Classification Search ............... 705/10
See application file for complete search history.

(56) References Cited

U.S. PATENT DOCUMENTS

| | | | | |
|---|---|---|---|---|
| 5,032,989 A | * | 7/1991 | Tornetta | 705/1.1 |
| 5,361,201 A | * | 11/1994 | Jost et al. | 705/35 |
| 5,420,968 A | * | 5/1995 | Johri | 345/619 |
| 5,680,305 A | * | 10/1997 | Apgar, IV | 705/10 |
| 6,604,083 B1 | * | 8/2003 | Bailey | 705/10 |
| 7,043,445 B2 | * | 5/2006 | Bailey | 705/10 |
| 7,412,398 B1 | * | 8/2008 | Bailey | 705/10 |
| 7,516,085 B2 | * | 4/2009 | Bailey | 705/10 |
| 7,752,069 B1 | | 7/2010 | Bailey | |

OTHER PUBLICATIONS

Bowlby, Sophie et al., Store Location: Problems and Methods—choosing the right site Retail & Distribution Management, Jan./Feb. 1985.*
Freehling, John, Using Drive Times to Construct Trading Areas GIS In Business Conference Proceedings, 1993.*
Cohen, Eric, Miles, minues & custom markets American Demographics, Jul./Aug. 1996.*
Hand, Herbert et al., Economic Feasibility Analysis for Retail Locations Journal of Small Business Management, vol. 17, No. 3, Jul. 1979.*
Kimes, Sheryl E. et al., Selecting Profitable Hotel Sites at La Quinta Motor Inns Interfaces, vol. 20, No. 2, Mar./Apr. 1990.*
Longley, Paul et al., GIS for Business and Services Planning GeInformation International, 1995, ISBN:0-470-23510-1.*

(Continued)

*Primary Examiner*—Scott L Jarrett
(74) *Attorney, Agent, or Firm*—Finnegan, Henderson, Farabow, Garrett & Dunner, LLP

(57) ABSTRACT

After defining a relevant market area around a selected geographical point, a map is generated using stored geographical map information around a selected geographical point and a geographical area is selected around that point. Multiple bands are formed on the map around the geographical point and market information is gathered from a database for the defined geographical area. The bands are weighted based according to empirical data drawn from within the market area, if available, or from data from a demographically matched location. A net demand model is constructed to perform point studies, comparison studies, area studies, and multi-unit simulations for the selected geographical area.

14 Claims, 19 Drawing Sheets

OTHER PUBLICATIONS

Applebaum, William, Methods for Determining Store Trade Areas, Market Penetration and Potential Sales Journal of Marketing Research, vol. 3, No. 2, May 1966.*

Overstreet, George, Creating value in oversupplied markets: The case of Charlottesville Virginia, hotels Cornell Hotel & Restaurant Administration Quarterly, vol. 34, No. 5, 1993.*

Eckenstahler, Charles R., Generating effective market and feasibility studies from your real estate consultant Economic Development Review, vol. 12, No. 3, Summer 1994.*

Schultz, James P. et al., A Hi-Tech Approach to Maximizing Branch Profits Bank Marketing, vol. 20, No. 6, Jun. 1988.*

Meyer, Terry G., Site Selection Vs. Site Evaluation: Techniques for Location Retail Outlets Real Estate Issues, vol. 13, No. 1, Spring/Summer 1988.*

Market and Feasibility Assessment for Longwood Manor Fiscal Associates, Jul. 24, 1998.*

Drezner, Tammy, Competitive facilyt location: Unequally attractive facilities University of Michigan, 1993, AAT 9319515, Abstract.*

Klein, Eleanor N., Project Feasibility Studies Growing in Importance National Real Estate Investor, vol. 31, No. 1, Oct. 1989.*

Zvi Drezner, Facility Location: A Survey of Applications and Methods (Springer Series in Operations Research and Financial Engineering), Springer, 1st edition, Sep. 11, 1995, ISBN-10: 0387945458.*

Brown-Kuse et al., "Theory and Experiments on Spatial Competition," Economic Inquiry, vol. 31, No. 1, pp. 138-165 (1993).

Doctrow et al., "Survival of the Fittest: Competition, Consolidation and Growth in the Assisted Living Industry," Journal of Real Estate Portfolio Management, vol. 5, No. 3, pp. 225-234 (1999).

Turkel, "A Fresh Look at Feasibility Studies," Lodging Hospitality, vol. 53, No. 1, p. 18 (1997).

Hyndman et al., "A comparison of measures of access to child health clinics and the implication for modeling the location of new clinics," Australian and New Zealand Journal of Public Health, vol. 23, No. 2, pp. 189-195 (1999).

O'Malley et al., "Retailing applications of geodemographics: a preliminary investigation," Marketing Intelligence & Planning, vol. 13, No. 2, pp. 29-35 (1995).

Kohsaka, "Three-Dimensional Representation and Estimation of Retail Store Demand by Bicubic Splines," Journal of Retailing, vol. 68, No. 2, pp. 221-241 (1992).

Davies et al., Store Location and Store Assessment Research, John Wiley & Sons, 1991.

Kerin et al., "Evaluation of Retail Store Locations through Profitability Analysis," Journal of Small Business Management, vol. 13, pp. 41-45 (1975).

Brunner et al., "The Influence of Driving Time upon Shopping Center Preference," Journal of Marketing, vol. 32, pp. 57-61 (1968).

* cited by examiner

| Category | Age < 65 | Mobility & Self-care Limits | Qualified by Income | Over 75 | 65 to 74 |
|---|---|---|---|---|---|
| A | Yes | Yes | No | No | No |
| B | Yes | Yes | Yes | No | No |
| C | No | Yes | No | Yes | No |
| D | No | Yes | Yes | Yes | No |
| E | No | Yes | No | No | Yes |
| F | No | Yes | Yes | No | Yes |
| G | No | No | Yes | Yes | No |
| H | No | No | No | Yes | No |
| I | No | No | No | No | Yes |
| J | No | No | Yes | No | Yes |

Fig. 13

SYSTEM AND METHOD FOR SELECTING MULTIPLE SITES USING WEIGHTED BANDS

RELATED APPLICATIONS

This is a division of application Ser. No. 09/953,156 filed Sep. 17, 2001, now U.S. Pat. No. 7,412,398 which is a continuation-in-part application of application Ser. No. 09/095,802 filed Jun. 11, 1998, now U.S. Pat. No. 6,604,083, and claims priority to provisional Application No. 60/049,448, filed on Jun. 12, 1997, all of which are incorporated herein by reference.

BACKGROUND OF THE INVENTION

1. Field of the Invention

This invention generally relates to a system for use in market analysis. More particularly, the system relates to use of geographical map databases to determine a demand and supply for a market area.

2. Description of Related Art

Before setting up a new business or buying an existing business, an entrepreneur wants to know the potential profitability of the business. To determine profitability, the net demand for the product or service must be determined. One important factor in determining net demand is the location of the business and the defined market area. Using the defined market area, supply and demand are determined. The net demand is found by subtracting existing supply from demand in the defined market area.

Market studies are performed in order to identify the supply and demand for a site in an area. This process may be carried out in many different ways because of differing definitions of the market area of interest. The market area of interest is the area in which customers reside and the area in which competitors are likely to be located.

Market analysts determine supply information by researching an area and finding out information such as the number and types of competitor sites. Generally, market analysts look at many different demographic components to determine demand. For example, one component of demographic demand for an assisted living home may be that a certain percentage of those aged 65 to 75 in the area who have incomes more than $25,000 will enter the proposed assisted living home. Based on the number of people in the age group 65-75, one may estimate the number of people and dollars that will be spent at the assisted living home by this age group. An accumulation of these data for each age group estimates gross revenue for the assisted living home.

One source of information about the characteristics of people in an area is the U.S. Bureau of Census, which counts people and keeps records of the number of people living in a defined area along with other identification data. The Census Bureau accumulates this information by house and by individual but for privacy reasons only releases information in groups. The smallest group normally released is a block group. A block group is about 200 households. A group of four to six block groups is called a census tract. A census tract tends to be smaller than a zip code and is commonly used to aggregate information about an area. The census bureau maintains this information in databases that may be purchased or accessed by the public. These databases include lists of block groups and demographic information associated with the block groups.

Another source of information needed is geographical information that links an area to the census information. Geographic information systems exist that include typical map data such as geographical features, roads, and landmarks as well as the boundaries for block groups. The geographical linear features, such as roads or geographic boundaries, are stored as polylines. The geographical area features, such as block groups, census tracts, and counties, are stored as polygons enclosed by polylines. The two are stored in a table together with census identifying data, which allows the geographical areas to be tied to demographic characteristics in the census databases.

One type of study performed by a market analyst is a point study. A point study is performed when an investor wishes to know the demand for a business at a particular site. To calculate demand for a business at a geographical point, an analyst must define a market area surrounding that point for the given business. Typically an analyst will define more than one market area, such as a primary and secondary market area. One simple method an analyst may use is to plot the site on a map and draw a circle around of the site of a given radius. The first radius selection of, for example, ten miles could be the primary market area, and a second selection of, for example, the next ten miles could be the secondary market area.

Previously, a market analyst would select some section of the map and assume that this is the market area. Often, a junior member of the analyst's firm goes out into a community and talks to the people of interest and uses the gathered information to define a market area. Then, to determine demand, a market analyst would calculate the number of potential purchasers in that area and the amount that these potential purchasers are expected to spend using the census information, to determine supply, the analyst would look at other suppliers in the market area. Using both the supply and demand information, a net demand can be determined. There are no set standards of how the initial market area is selected or which census tracts or block groups are included in that market area. The results may be easily manipulated by simply redefining the market area, thus greatly reducing the legitimacy of such studies because the results are not replicable by another analyst with the same skills and background.

A system is needed that standardizes the selection of a market area and allows for reproducible studies.

SUMMARY OF THE INVENTION

Systems and methods consistent with the principles of the present invention address the need for standardization of market selection by defining a market area based on travel time from the site.

A system or method consistent with the principles of the present invention selects a primary and a secondary market area based on travel time. More than two market areas may also be selected. In addition, block groups are accepted as within the market area based on certain rules, thereby standardizing their selection.

Systems and methods consistent with the present invention generate a map using stored geographical information. A geographical point or area is selected from the map for analysis. A travel time around the geographical point is selected. The geographical area around the geographical point within the travel time is defined using data holding travel time information. Market information stored in a database is gathered for the defined geographical area from a memory location. Demand is computed from the demographic groups in each travel-time-defined area and weighted according to the model used by the analyst. Supply of competition is computed by surveying the competition and plotting each on the map, weighing the results by travel time and other factors according to the model used by the analyst. The final result, net demand, is the difference between demand and supply.

BRIEF DESCRIPTION OF THE DRAWINGS

The accompanying drawings, which are incorporated in and constitute a part of this specification, illustrate an embodiment of the invention and, together with the description, explain the objects, advantages, and principles of the invention. In the drawings:

FIG. 13 is a table corresponding to the exemplary demand model of FIGS. 12A-12D;

DETAILED DESCRIPTION OF THE INVENTION

The following detailed description refers to the accompanying drawings in which the same reference numbers in different drawings identify the same or similar elements. However, the following description does not limit the invention. Instead, the scope of the invention is defined by the appended claims and equivalents.

The present invention provides a way of defining the market area that may be repeated by another analyst which allows for a standard in the industry. Instead of using miles around a point which ignores barriers like a river or using psychological boundaries, which are not replicable, the present invention uses travel time. A database contains the travel time traces from the proposed site in the geographical area under study.

The analyst selects travel times based on empirical research that relates travel time to use of the proposed facility. Travel time is objective unlike other methods used such as basing market area on psychological characteristics of the population. This latter method has no rules about where the market will begin and end.

Using travel time to define a market area is most reliable when the business or service draws local patronage. For example, assisted living facilities are typically selected to be either close to the disabled person's home if the spouse remains active, or close to the home of a relative.

Figure 1:
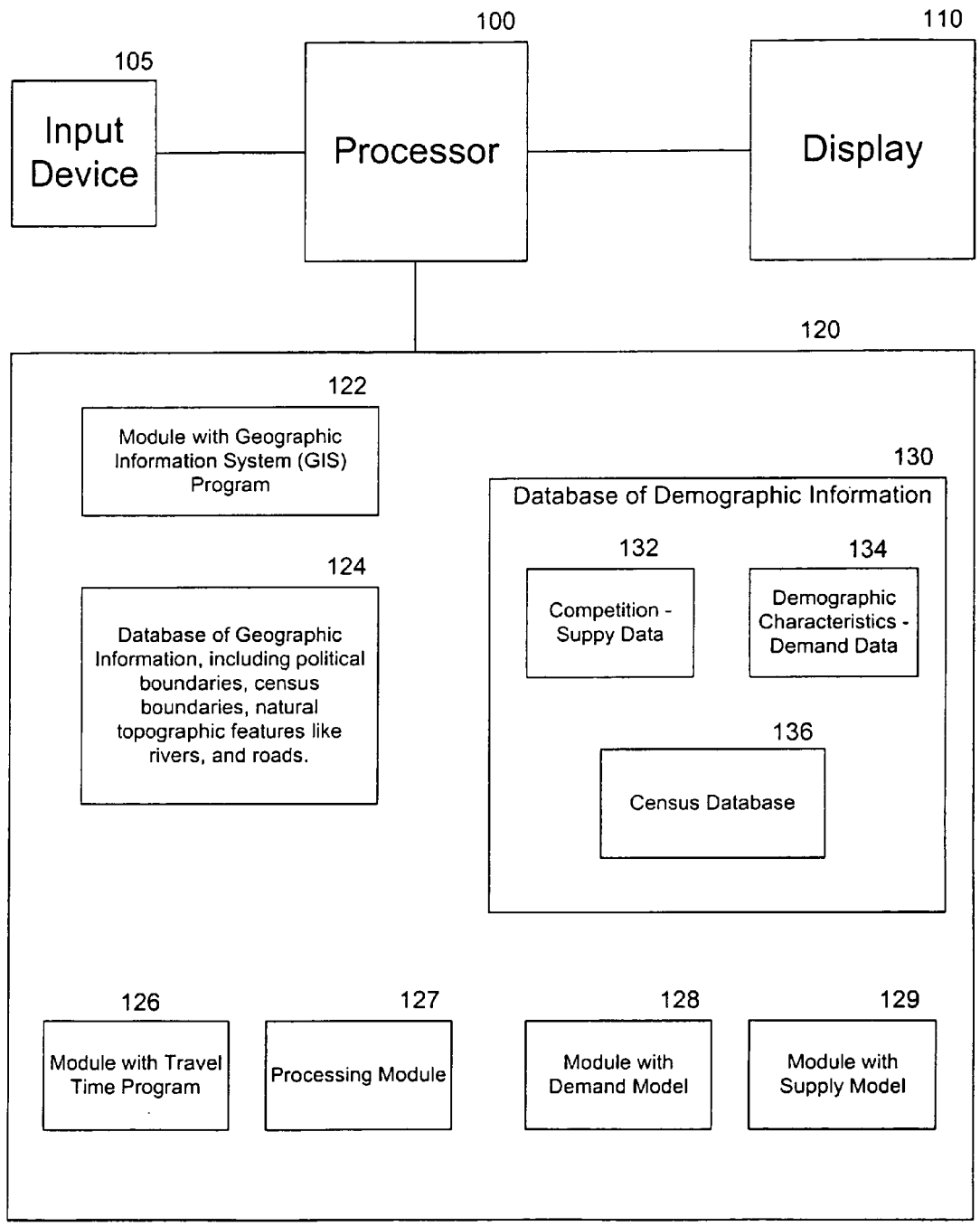
FIG. 1 is an overall diagram of a system for implementing the present invention.

FIG. 1 shows a block diagram of a processor configured in a manner consistent with the present invention. A processor 100 receives input from an input device 105 and displays information on a display 110. Memory 120 includes a module with a geographic information system program (GIS) 122, a module with travel time program 126, a processing module 127, a module with demand model program 128, and a module with supply model program 129. The module with demand model program 128 includes, for the area under consideration, empirical relationships or assumptions concerning the relationships between demographic demand and travel time, such as the decay of demand with increased travel time from the site. The module with supply model program 129 includes, if available for the area under consideration, empirical relationships or assumptions concerning the relationships between supply of competition and travel time.

Data in the geographical information database 124, includes political boundaries, census unit boundaries, natural topographical boundaries including rivers and roads. The database of demographic information 130 includes supply data 132, demand data 134, and a census database 136. Supply data 132 is data related to competition such as other stores in an area. Demand data are demographic information providing information on the population in an area. Census database 136 includes information relating the census units to demand data 134 and supply data 132.

Figure 2:
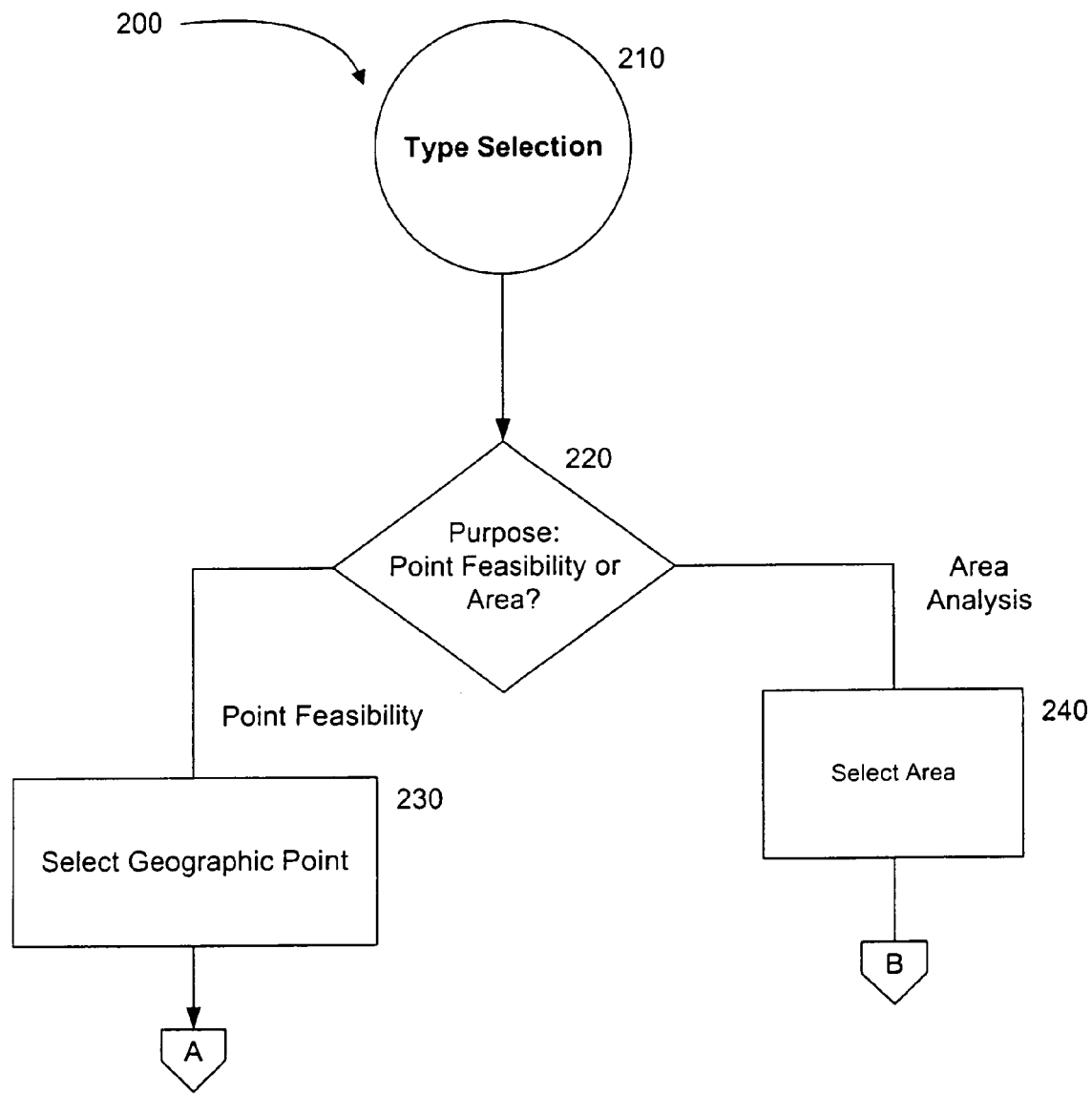
FIG. 2 is a flow chart showing the steps for selecting a type of market analysis.

FIG. 2 is a flowchart showing the initial steps 200 taken by an analyst to a market analysis. First, a market analyst, using input device 105, must select a type of market study (step 210). Generally, a market analyst may select one of two types of market analysis—a point feasibility study or an area feasibility study (step 220). The point feasibility study determines the market analysis for a site in a specific location.

An area analysis study is used to try to determine the best site locations in a general area. An analyst performs an area study when an investor wishes to find what point within a geographical area is best for business. In the prior art, only a few points were processed as it was time consuming to analyze each point. An area study using the present invention, involves analyzing every possible point in an area using the point analysis. In one implementation, some points on the map, such as those where bodies of water lay or a large factory exists, will not be analyzed. Generally, in the present invention, an area analysis allows the analyst to select a geographical area and to iterate a point analysis for almost every point within that area equal to the number of demographic units (e.g., block groups, census tracts), covering the area completely.

If a point feasibility is selected, the analyst must select a specific geographical point (step 230). For an area analysis the analyst must select a geographical area and processing continues at B in FIG. 9 (step 240). The point feasibility study determines the market analysis for a site in a specific location.

Figure 3:
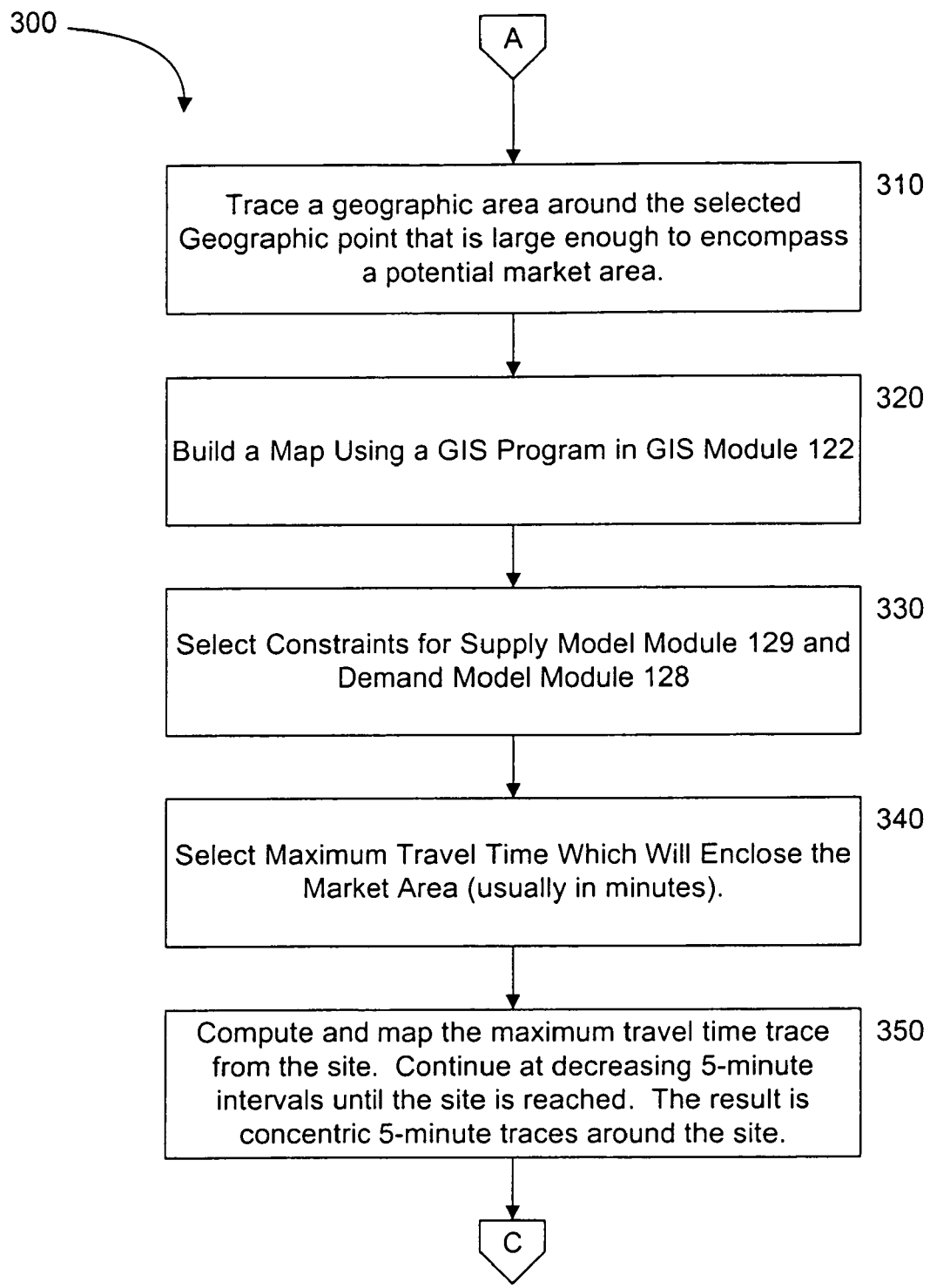
FIG. 3 is a flow chart showing the steps for performing market analysis.

If point analysis is selected processing continues as shown in steps 300 in FIG. 3. First, the analyst traces an area around the geographical point that encompasses any potential market area using knowledge known to the analysts such as type of neighborhoods around the point (step 310). The analyst also has access to many other sources of data including information obtained from the Bureau of the Census and other sources. GIS programs, such as that in GIS module 122, create a map for the traced area around the geographical point (step 320). The analyst may specify the different attributes of the displayed map, for example, the units that the map uses in terms of scale (centimeters per mile) or what natural formations the user wishes to have included. The user may select to display streets, landmarks, county boundaries, towns, Census boundaries, and many different types of units. The GIS program 122 generates the map by reading data from geographic database 124 that holds map information.

The analyst selects constraints to define the supply model module 129 and demand model module 128 (step 330). The analyst uses a model that defines the weight that will be given to different information. For example, based on available empirical evidence for a certain service, the customer base may exclude anyone younger than 20 and give no weight to data on those younger than 20. On the other hand, the most likely customers for a certain business may be aged 30 to 40, in which case the demand model will weigh more highly people in that age group and a greater percentage of those in the age group of 30 to 40 will be presumed to be customers. Similarly, a smaller percentage of those in the age group 40 to 50 will be presumed to be customers. Another constraint in the models may be assigning different percentages for each travel time trace around the site based on the closeness of the trace to the site.

Figures 4A, 4B:
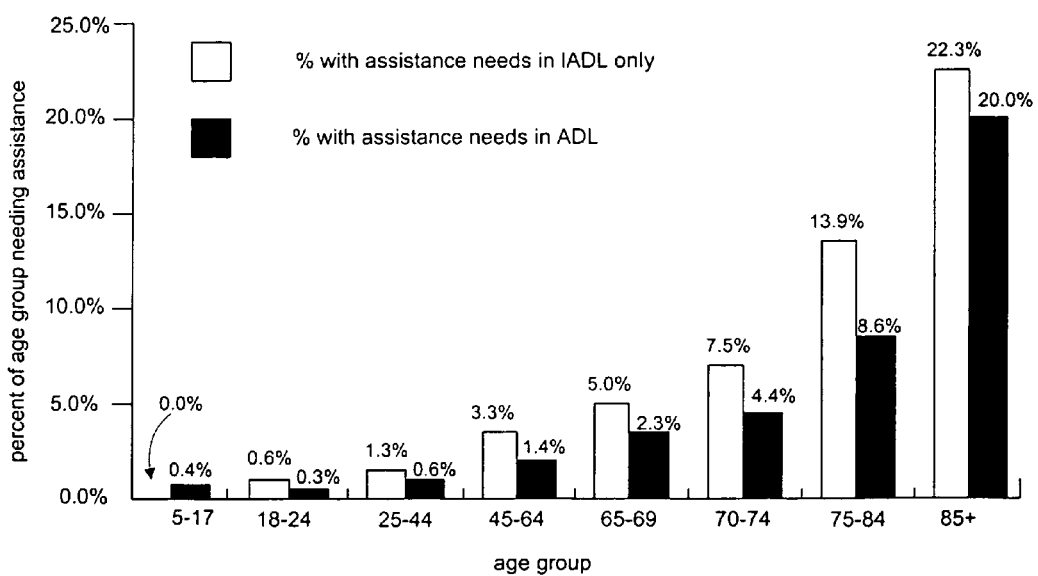
FIGS. 4a-4c are sample display screens showing information related to a market demand model.

FIG. 4*a* shows an example display 400 of different weights assigned to different travel traces. The closer to the site a census unit is, the more likely customers will come from that census unit. The demand is determined by adding up the number of people the demand model defines to be of interest. The supply is determined by using gathered information about other suppliers in the area. The net demand is the projected demand in the area minus the supply in that area. If the net demand is positive, with the demand greater than supply, the project may be desirable. If the demand is negative, with demand less than the current supply, then the project is not desirable.

One example of a demand model is for assisted living homes. One component of the demand model is the percentage of people in given age groups that require care. FIG. 4*b* shows a chart listing various age groups and the percentage of people in those groups requiring two different levels of care.

Figure 4C:
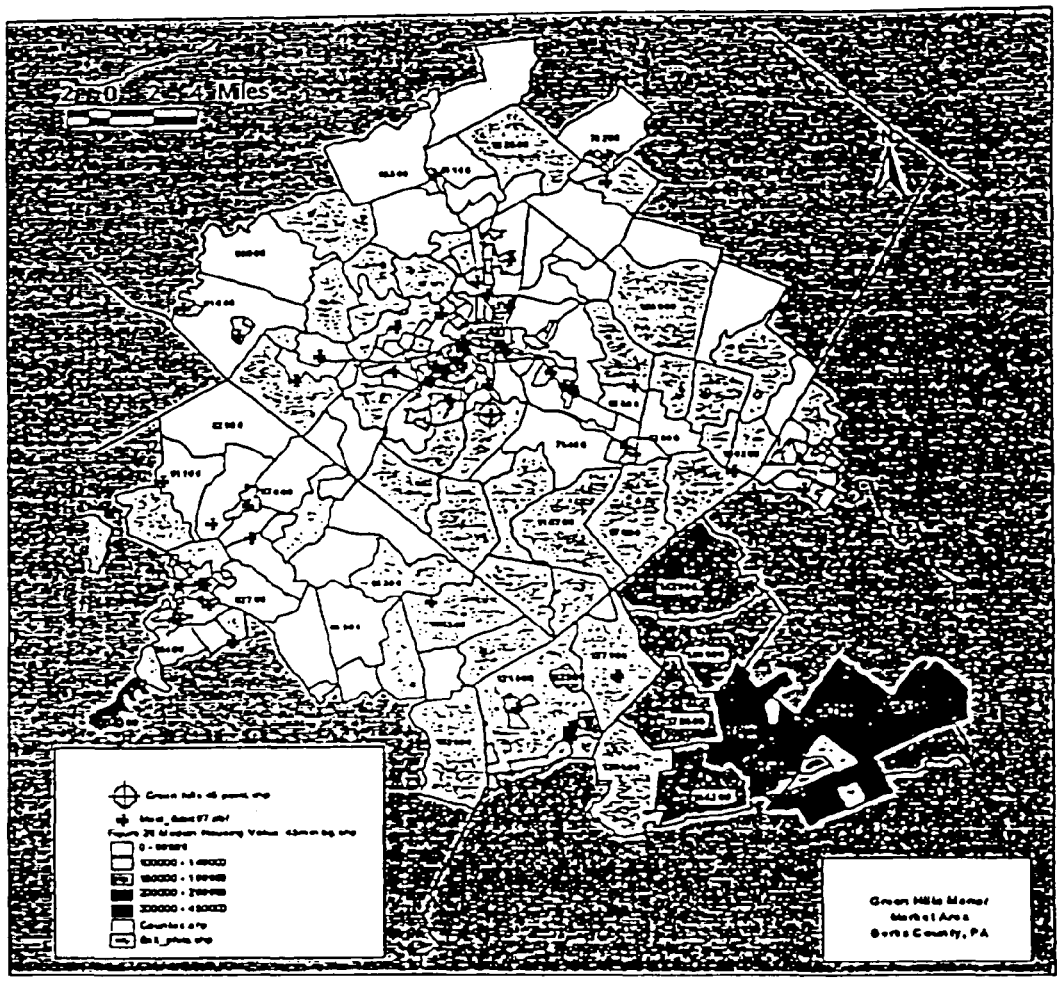

Another criterion for the demand model may be related to housing values. Population groups may be weighted differently based on the median home values in the block group. FIG. 4*c* shows an example of a map of census block groups with different shadings provided based on the median house value. The model may weight more highly the population in higher priced home value block groups. Therefore, this example model has age constraints, disability constraints and housing value constraints. The calculation of demand will adjust the weight given to a population group based on age, disability and housing values.

Figure 5A:
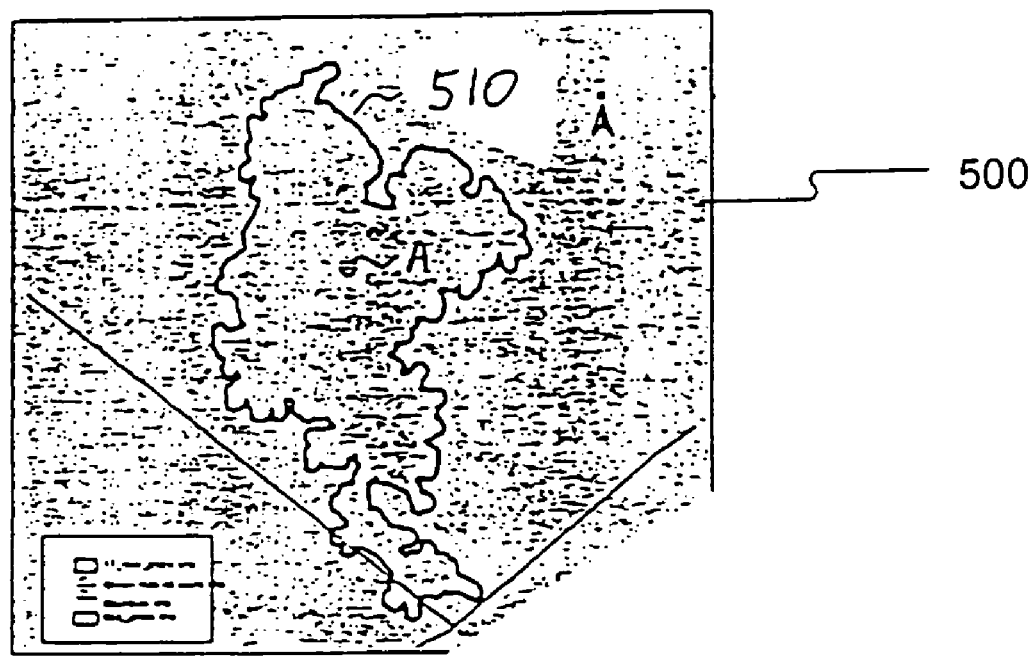
FIGS. 5a-5e are sample display screens showing a map and associate travel time traces.
Figure 5B:
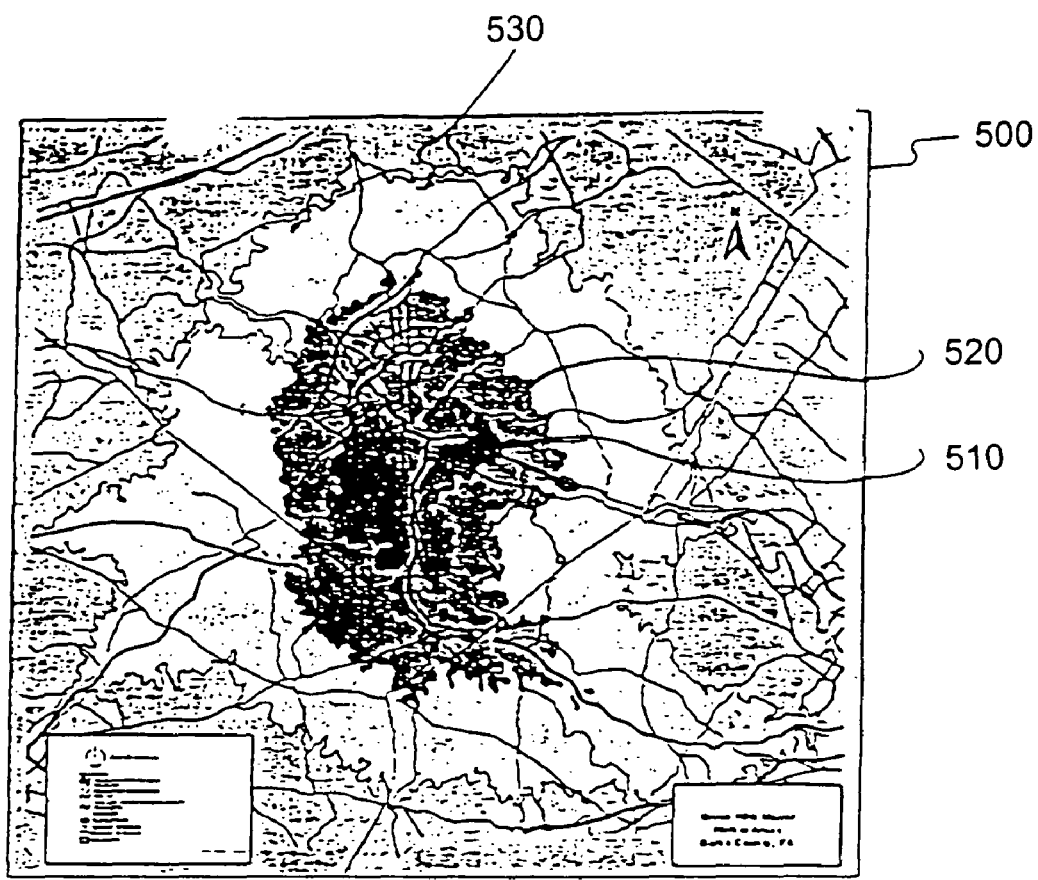
Figures 5C, 5D, 5E:
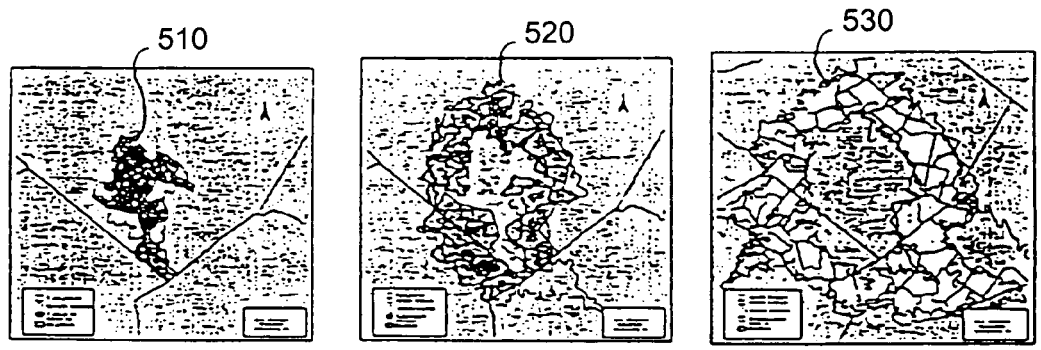

Processing module 127 prompts the analyst to select a maximum travel time that encompasses the traced area (step 340). FIG. 5*a* shows a display of a map 500 with the selected geographical point A at the center and a time travel trace 510 around the point. The selected maximum travel time is usually in minutes, for example, a trace representing a 20 minute trip from the point may be a likely market area depending on the business. Travel time program module 126 maps the maximum travel time trace from the site and maps decreasing intervals until the site is reached (step 350). The result is concentric traces around the site. Another example of an interval trace would contain a trace for every few minutes of additional travel time. FIG. 5*b* shows a map 500 with three travel time traces 510, 520, and 530 at different intervals from the site. FIG. 5*c* shows the first travel trace closest to the site representing a 17 minute travel time around the site. FIG. 5*d* shows a second travel trace representing travel times between 17 and 30 minutes around the site. FIG. 5*e* shows a third travel trace representing travel times between 30 and 45 minutes around the site.

The travel time program module 128 uses available travel time databases and generally operates as follows. A database of street networks, such as the Bureau of the Census' Tiger Street Files, has information on travel rates on different roads. The street file is converted into a network of nodes (intersections) and connections between the nodes (streets). Each line segment (street) has associated data about the class of road and other information such as one-way street or no left turns. The class of road determines the average speed or rate (R) to be used and the length of the line segment defines a distance (D). The time to travel over a line segment is found by dividing distance (D) by the rate (R). The program 128 solves the network by following every possible path from the geographical point selected and sums the travel times for each segment until the travel time selected is reached at a point on the map. The resulting points around the selected point form an irregular trace of the market area.

Figure 6:
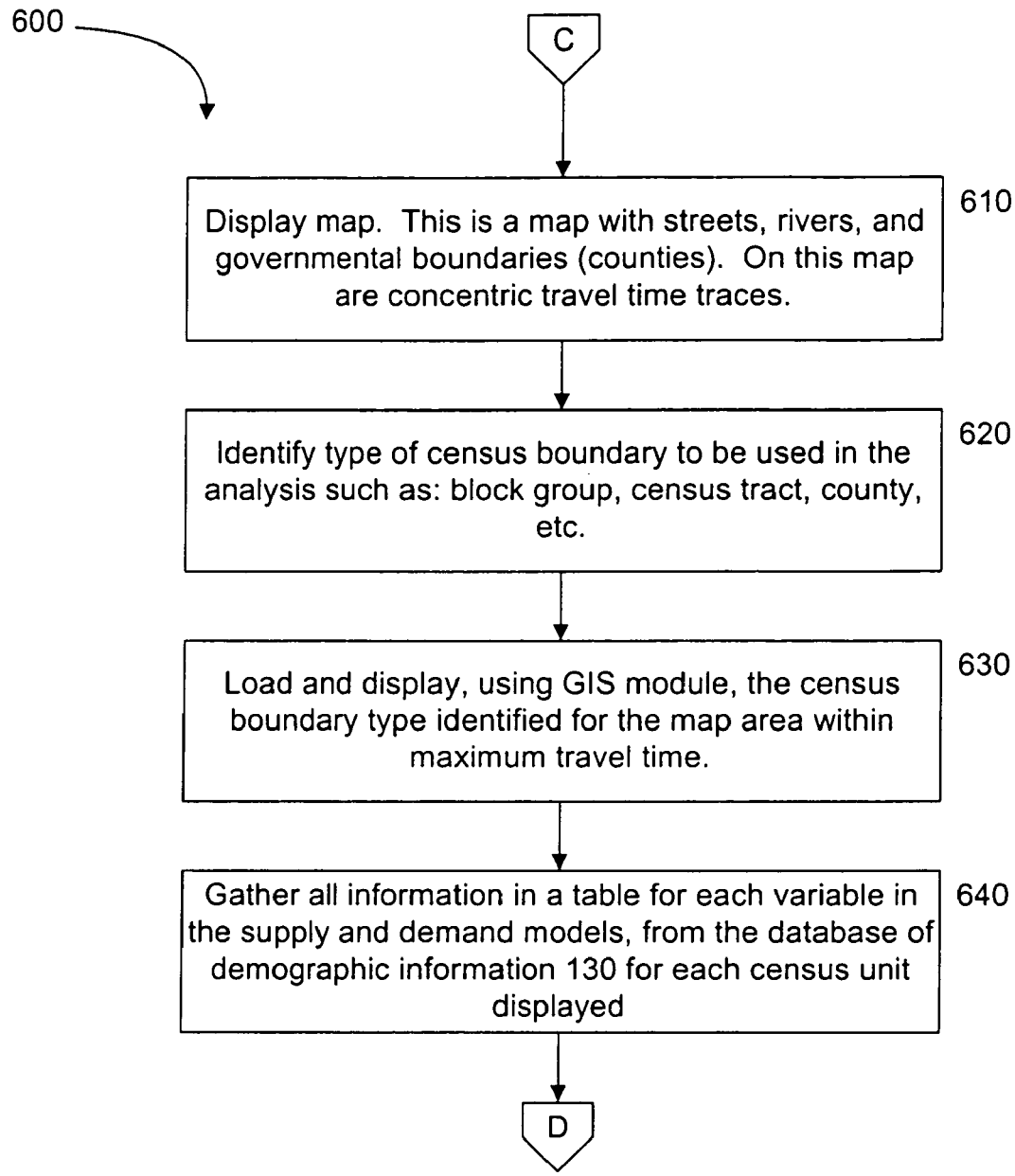
FIG. 6 is a flowchart showing additional steps for performing market analysis by using demographic data.
Figure 7:
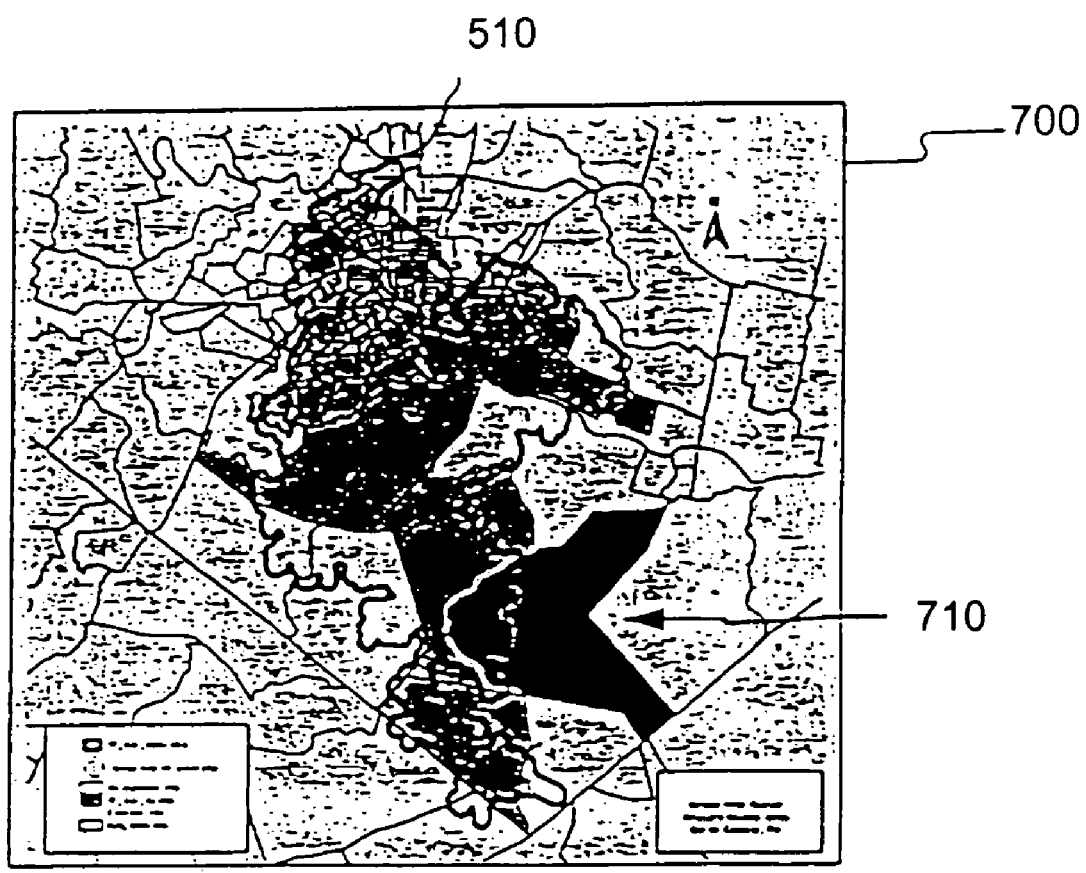
FIG. 7 is a sample screen display of a map with block groups.

Processing continues in FIG. 6 which shows flowchart 600 with additional processing steps. Travel time program module 126 displays a map having typical map information such as rivers and roads using data in the geographic database 125 for the traced area (step 610). The map also shows the concentric travel time traces. The analyst must now select a type of census boundary to be used in the market analysis such as a block group, census tract, or county lines (step 620). For simplicity the specific example used throughout this application will assume that the analyst selects block groups as the unit of interest. Next GIS module 122 loads and displays the census boundary type on the map area within the maximum travel time (step 630). FIG. 7 shows a map display 700 with block groups inserted.

Processing module 127 creates a market area table with an entry for each census unit displayed (step 640). Columns are included for each variable in the supply and demand models and data corresponding to the variables is copied from the demographic information database 130.

Figure 8:
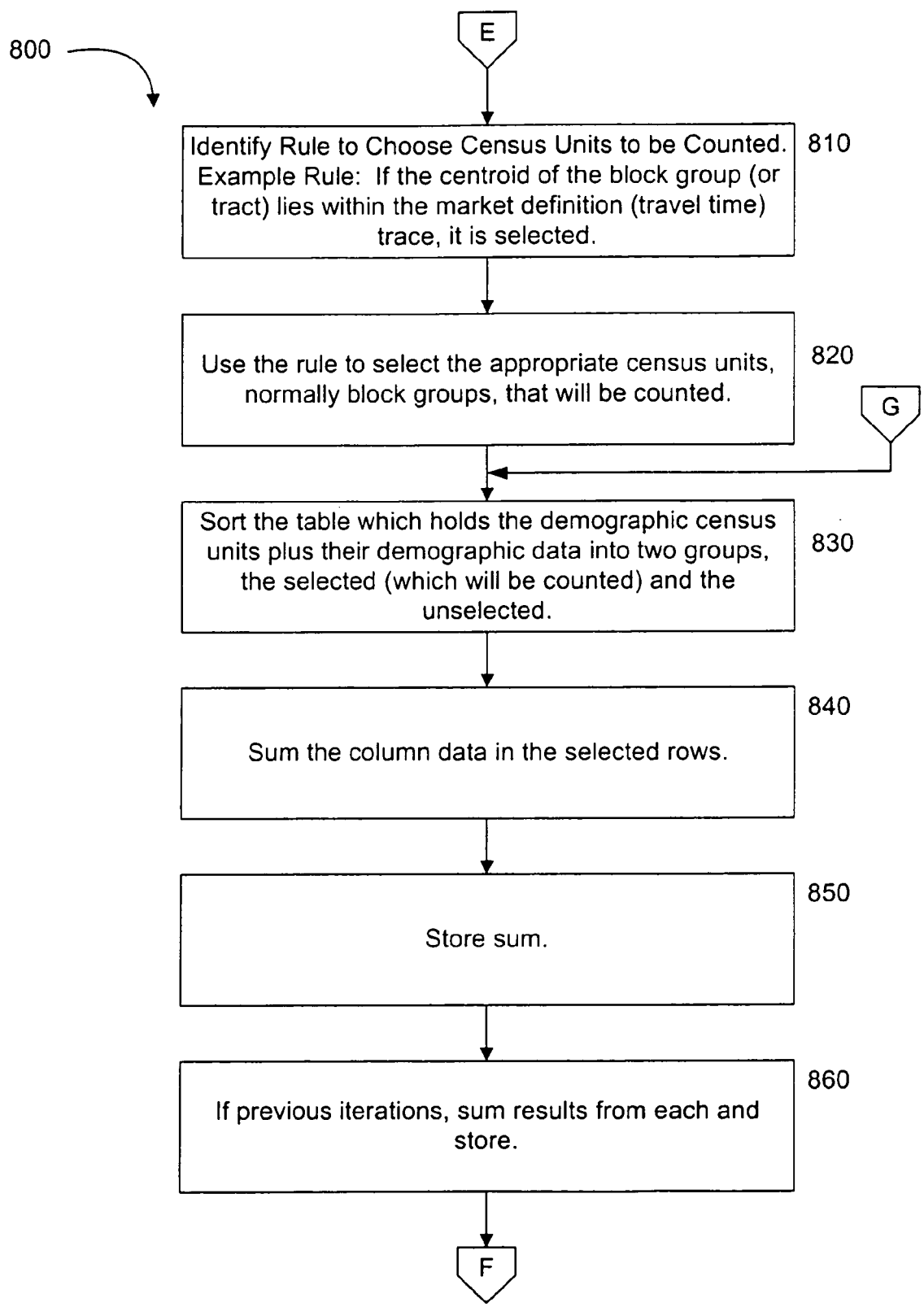
FIG. 8 is a flowchart showing additional steps for performing market analysis including summing demographic data.

FIG. 8 shows a flowchart 800 with additional steps for analyzing a market consistent with the present invention. The analyst must now select which block groups to include in the market study. For example, some block groups may only be partially within the maximum travel time, therefore the analyst must decide how to select which groups to include in the analysis and the weight to be provided to each group. For example in FIG. 7, block group 710 is a group only partially within the travel time trace 510. The analyst may select a rule to choose block groups (step 810). One example rule is to determine the centroid of a block group and if the centroid is within the travel time trace include the entire block group in the analysis, otherwise do not. Processing module 127 uses the identified rule to select the appropriate census units to be counted (step 820). The market area table created by the processing module 127 is sorted to separate the selected and non-selected block groups (step 830). In FIG. 7, block group 710 has a center that is not within the travel trace 510, this block group is not selected using the example rule. Processing module 127 sums the column data for each of the rows selected (step 840) and stores the same (step 850). Each column corresponds to a variable in the demand or supply model. The summed result for a column is the total value for the associated variable.

Entry point G shown above step 830 is where processing begins for additional traces of market area to be studied. Each travel time area trace may be successively processed. Therefore, after summing the columns for a particular market area, if results for shorter travel time traces exist, the current summed results are added to the previously obtained summed results (step 860). The demand or supply model may require that before summing results from different iterations, each iteration's trace be provided a different weighted value, the weights being empirically based when possible. Therefore, the summed value of the supply or demand components for a trace may first be multiplied by a weighting factor reflecting that trace's closeness to the business site.

Figure 9:
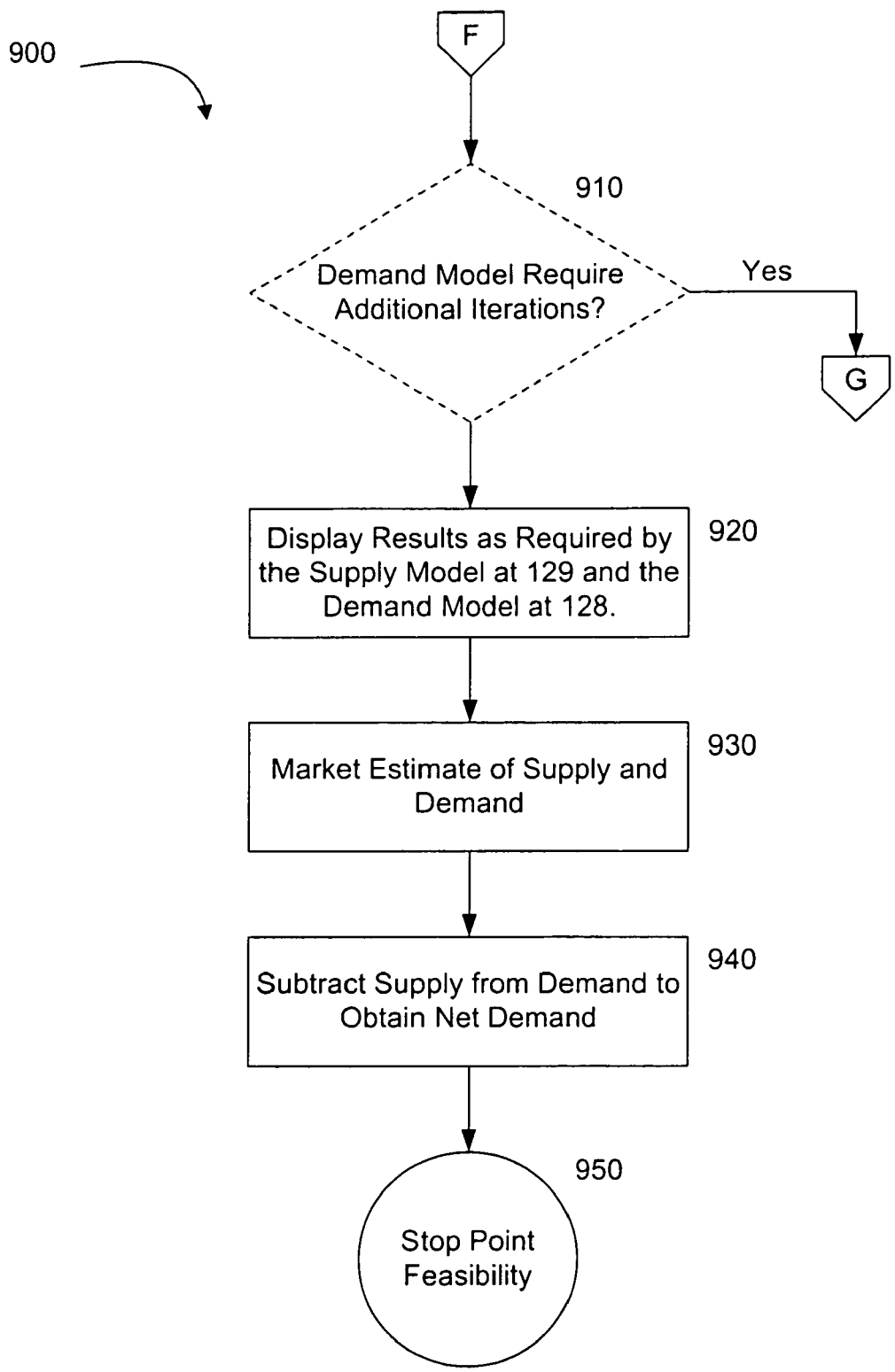
FIG. 9 is a flowchart showing additional steps for performing market analysis including calculating supply and demand.

FIG. 9 shows a flowchart 900 for further processing market analysis according to the present invention. Processing module 127 determines whether the demand and supply models require additional iterations for processing additional traces of travel time (step 920). If so, processing repeats starting at step 830 in FIG. 8. Otherwise, the final summed results are displayed (step 930). The market estimate of supply and demand is determined (step 940). This estimate may be based on calculations of the market and demand supply models or may be input by an analyst reviewing the displayed summed column data. The estimated supply is subtracted from the demand to obtain the net demand (step 950). The point feasibility study is complete (step 960).

Figure 10:
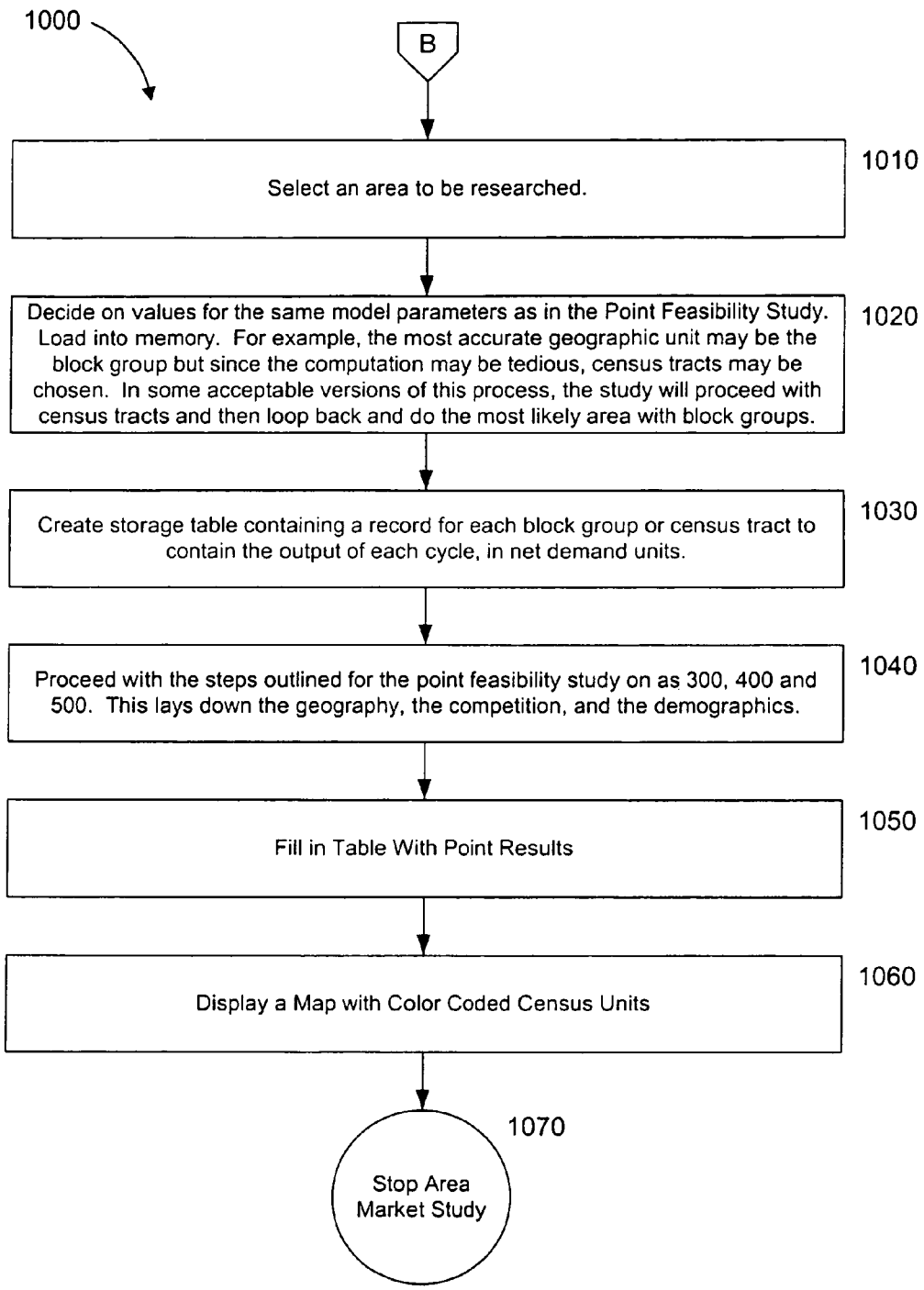
FIG. 10 is a flowchart showing the steps for an area feasibility study.

FIG. 10 shows a flowchart 1000 that includes the steps for an area feasibility study. As previously discussed, an area feasibility study is performed by selecting rule that defines one point within each of the census or administrative boundaries such as a block group. First, the analyst selects a geographical area to be researched (step 1010). The analyst must select a unit such as a block group or some other boundary to use in the analysis (step 1020). Then, each unit within the selected area is given a row in a newly created storage table containing a record for each unit, such as a block group (step 1030). The point feasibility study is repeated for all possible points within the area (step 1040). Processing module 127 fills in the table with the results of the point studies for each census unit as the point studies are performed (step 1050). Processing module 127 uses display 110 to display a map with color coded filling to show the different demand levels calculated for each census unit (step 1060). The market area analysis is then complete (step 1070).

Referring back to FIGS. 5*a* and 5*b*, having obtained traces based on travel time, the next step is to select geographical area units such as block groups. One skilled in the art will appreciate that using the system shown in FIG. 1, one may define traces based on distance, for example, circular traces. Additionally, one may use polygons, rectangles, or other geometric shapes to define traces.

One rule to select a block group is discussed earlier. Other rules may be used. Also, as discussed earlier, having obtained the bands of block groups, weights need to be assigned to each band to weight both the supply and demand from each of the bands. Additionally, as discussed earlier, the weights are empirically based.

In order to weight the bands, research may be conducted within the market area to determine the location of the existing facilities located in the defined market area. As part of the supply and demand research, the address of each resident at entry may be coded and the code for the resident may be plotted using the system described in FIG. 1. The process of plotting the code for each resident is sometimes referred to as "geocoding."

Figure 11:
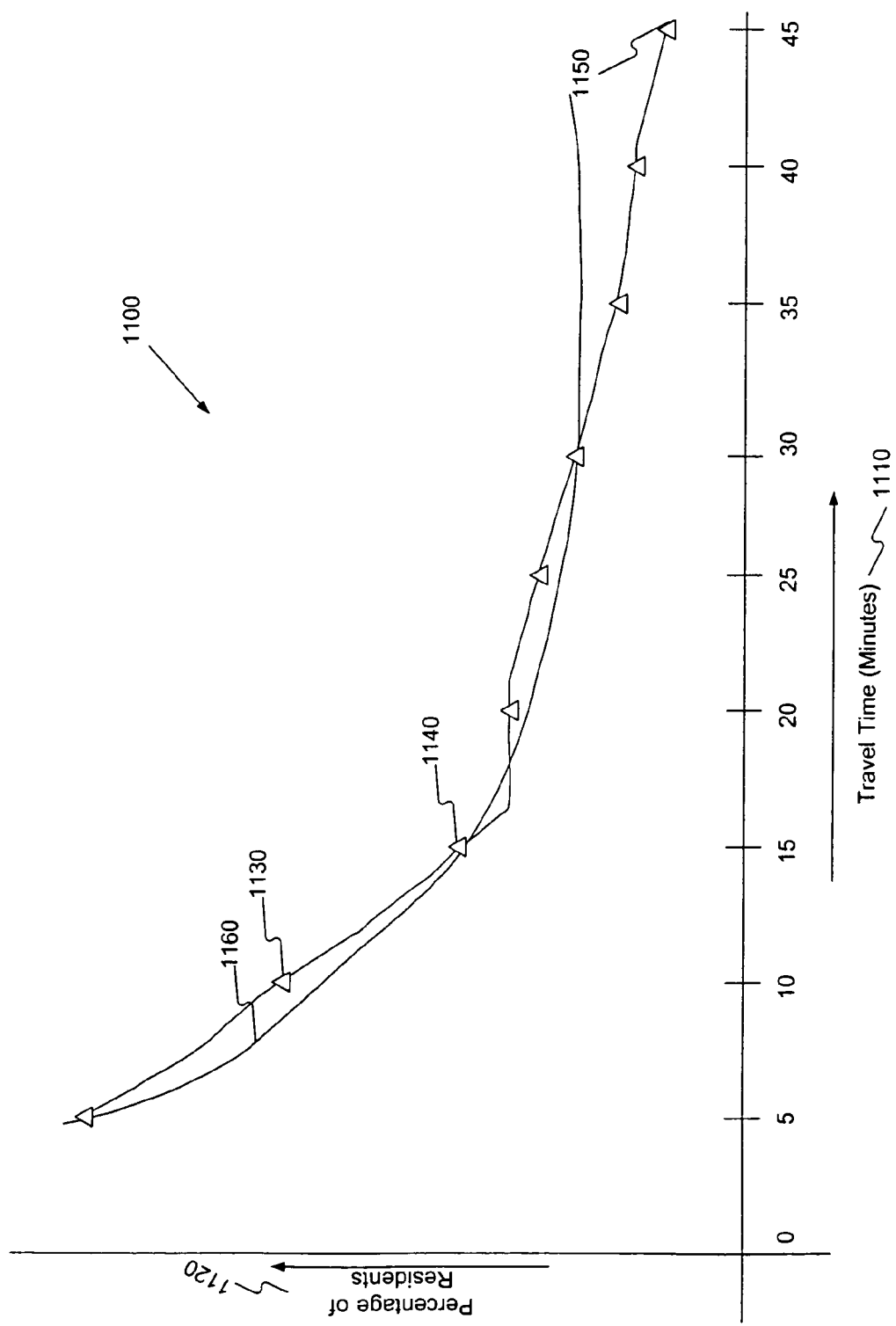
FIG. 11 is an exemplary histogram and a corresponding regression fitting curve consistent with the present invention.

As discussed with respect to step 860 (FIG. 8) the supply and demand value for each travel band or block group band is empirically weighted. The weighting of the travel bands may be accomplished using the processing module 127 and other components of FIG. 1. In one method consistent with the present invention, having summed the columns for each travel band, as discussed in steps 840 and 850 (FIG. 8) the customers from homes located within the market area may be separated from those transferred from another facility. Similarly, those customers that might have joined a facility from outside the market area may be separated from the other customers. This separation of customers helps develop a more accurate demand model, which reflects "from home" residents or customers using one set of variables, transfers from within the market area using another set, and transfers in from outside the market area using a third set. Thus, in this regard, all residents may not be treated the same way making the process more predictive. As shown in FIG. 11, the travel bands are then plotted on a histogram (bar graph) 1100 with the percentage of the residents, 1130, 1140, . . . 1150 from each travel band on the Y axis and the travel time bands on the X axis. A regression curve 1160 is then fitted to the tops of the bars and a correlation coefficient is computed. Although, the regression curve shown in FIG. 11 is exponential (for example, $y=58.908\ e^{-0.0519x}$, $R^2=0.8032$), it may also be based on a polynomial (for example $y=-0.0244x^2+1.0889x+7.4306$, $R^2=1$). Specifically, regression curve 1160 shows a steady decay as the travel time increases. It represents the situation where the facility being analyzed is in the residential area. The graph may be polynomial where the facility that is being analyzed is not in a residential area, for example. This is because where the facility being analyzed is in a non-residential area, "from home" enrollment very near the facility will be zero. The empirical relationships disclosed by the regression curve from multiple facilities within the market area allow the weighting of band data consistent with the market area at issue, instead of weighting based on a national average, which may not be consistent with the data for the market area at issue. The histograms may be clustered to facilitate curve fitting. Also, the regression-histogram method may be replaced by another standard method that organizes empirical data, such as a step-wise regression, which allows the testing of variables for their contribution to explanation. The travel bands may then be clustered, for example, from the nine bands shown in FIG. 11 to three bands. Besides clustering other means may also be used, such as transforming the data according the area of the band or clustering by a quadrant to facilitate better explanatory statistics, provided that the results are replicable by an independent investigator and no data is omitted arbitrarily. Any one of several rules may be followed to cluster the bands. For example, the nine bands may be clustered into three equal sized bands, or one band may have 5% of the customers, another 15%, and the third 80%. One skilled in the art will understand that other rules may also be used to cluster the bands. Although one need not perform this step, it does reduce the number of travel bands. Additionally, each one of these travel bands has a contribution weight, which may be equal to the percentage of customers that come from that particular band.

In another method consistent with the present invention once customers residing in homes located within the market area are separated from those that were transferred and once customers from outside the market area are separated from those from inside the market area, step-wise regression may be used to cluster the data, dropping out bands and clustering their contents where the band does not contribute to increasing the correlation coefficient. One skilled in the art will appreciate that other methods may also be used to arrive at contribution weights for each travel band.

In another embodiment consistent with the present invention, the market area may be defined based on the distance of the facility from points around the facility. Thus, for example, the market area may be a circle with a five-mile radius and its center at the facility. As discussed earlier, the market area may be of other shapes, such as it may be rectangular. One skilled in the art will appreciate that regression or other statistical techniques described with respect to FIG. 11 may once again be used to generate bands around the facility. These bands may then be assigned weights based on the proportion of the potential customers each band contributes to the facility.

Having determined the contribution weight for each band, one may use the contribution weight as a factor to adjust the supply and demand associated with each band. For example, using the processing module 127, one may reduce the supply of 100 beds in the outermost travel band to five by multiplying the contribution weight of that travel band, i.e., 5%, with the supply of beds. Similarly, one may adjust the demand for each band by factoring in the contribution weight associated with each band; but, the methods to adjust the contribution weights should not just be guesses or arbitrary. The methodology consistent with the invention uses reproducible techniques to define a market area and bands, and draw empirical data from within the market area to validate the band weights and the demand and supply models used in the computations.

Figure 12A:
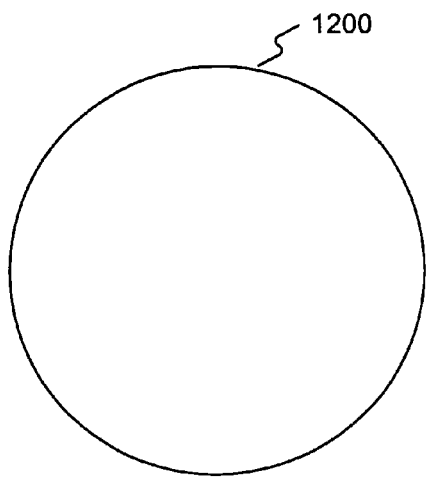
FIGS. 12A-12D are diagrams illustrating the concept of a demand model consistent with the present invention.
Figure 12B:
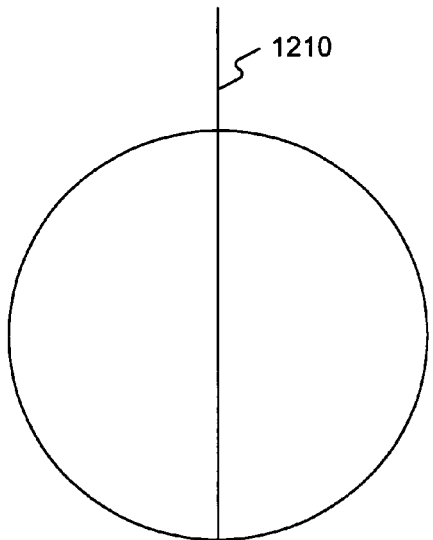
Figure 12C:
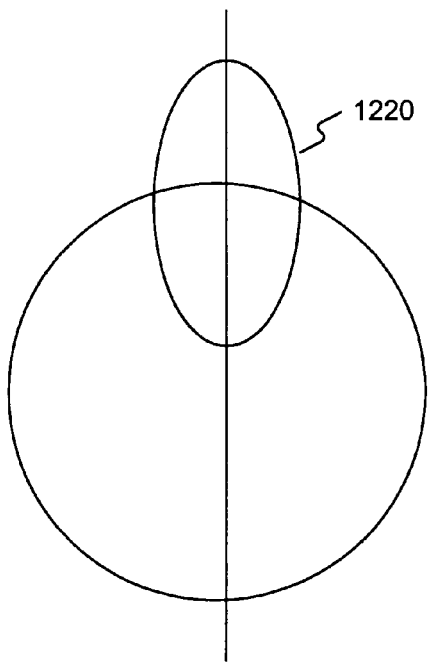
Figure 12D:
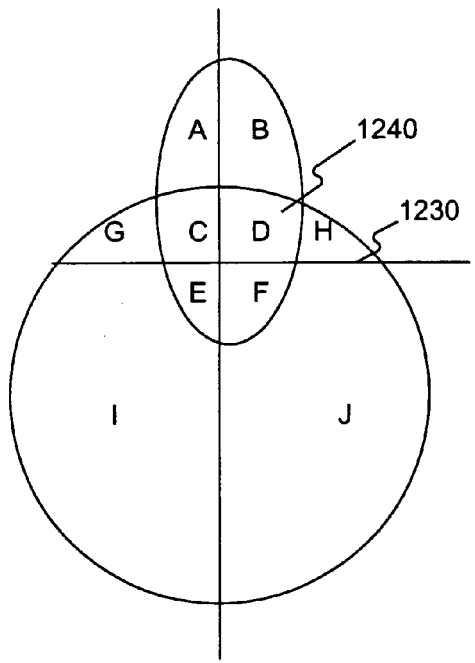

Several different types of demand models may be used consistent with the present invention. One type of demand model is explained with respect to FIGS. 12 and 13. Venn diagrams graphically explain the filtering or selection of demographics data using a demand model. FIG. 12A depicts a starting point, a circle, that includes every person over the age of 65 in a given market area based on census data, which, as discussed earlier, may be stored in the census data base 136 stored as part of the data base of demographic information 130 (shown in FIG. 1). As shown in FIG. 12B, one may then draw a vertical line 1210 that separates the households that, for example, have an income greater than $25,000 per year from those that have an income of $25,000 or less. Next, by analyzing the demographics information stored in the database of demographic information 130 and other sources of information, one may represent via an ellipse 1220 (FIG. 12 C) representing the concept or the subset of the population that has both mobility and self-care limitations. Such individuals are conceptually shown to be within the ellipse and those that do not have mobility and self-care limitations are outside the ellipse. Finally, as shown in FIG. 12D, one may add a horizontal line separating the circle into two halves which are not equal. The upper half represents those individuals who are 75 or older. Everyone inside the circle 1200 and below horizontal line 1230 is older than 65, but younger than 75. As discussed earlier, one skilled in the art will appreciate that other variables or constraints such as gender may be used to further refine the demand model.

The data associated with the demand model as depicted in the Venn diagrams in FIGS. 12A-12D may also be stored in a table such as that shown in FIG. 13. FIG. 13 depicts a table 1300 that, when processed by the processing module, provides one type of demand model. The demand model shown in FIG. 13 depicts the various categories of interest that may be incorporated in a demand model. One such category may be the age 1340, mobility and self-care limits 1350, qualified by income 1360, over the age of 75 1370, between the age of 65-74 1380. One skilled in the art will appreciate that other ways of arranging data corresponding to the demand model or other techniques for data storage and access may be used to represent the demand model as well as process the demand model in order to apply the demand model to the weighted bands.

Figure 14:
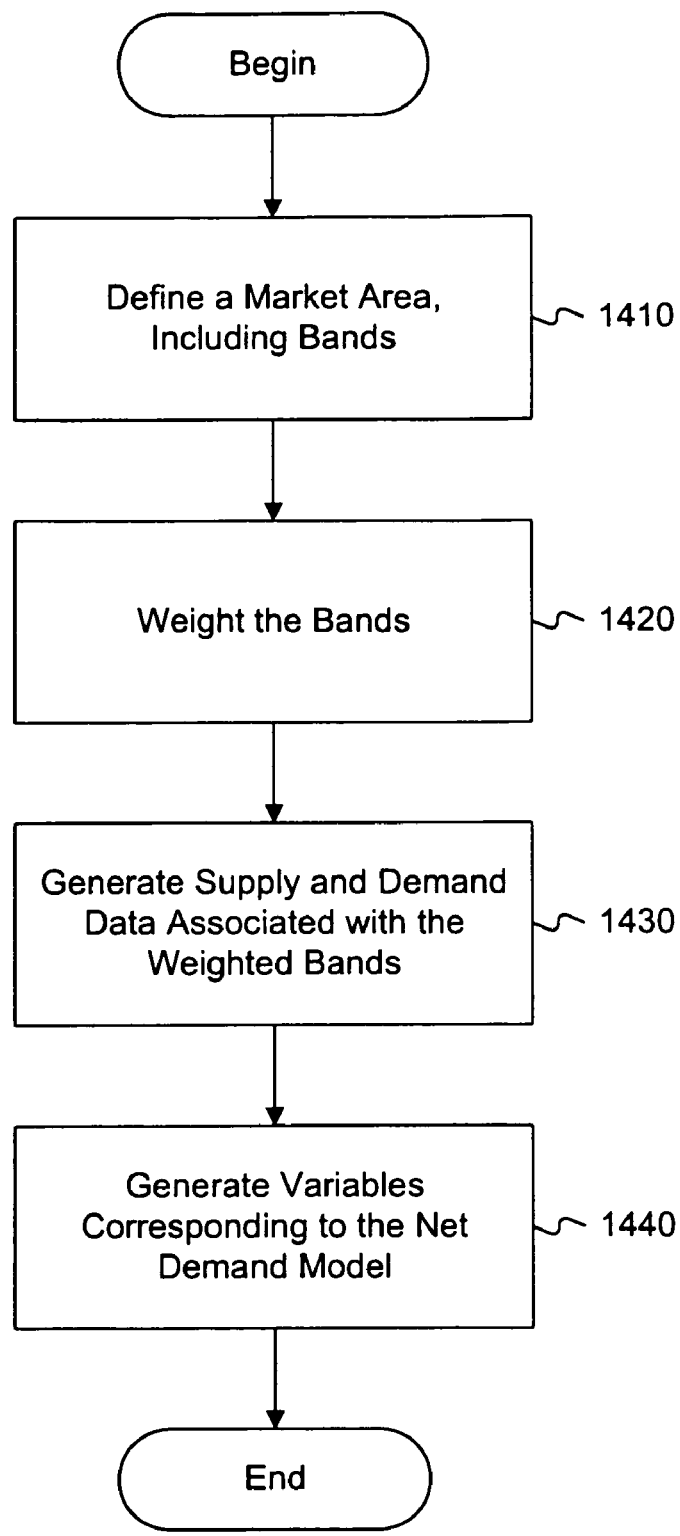
FIG. 14 is an exemplary flow chart corresponding to determining variables associated with the net demand model, consistent with the present invention.
Figure 15:
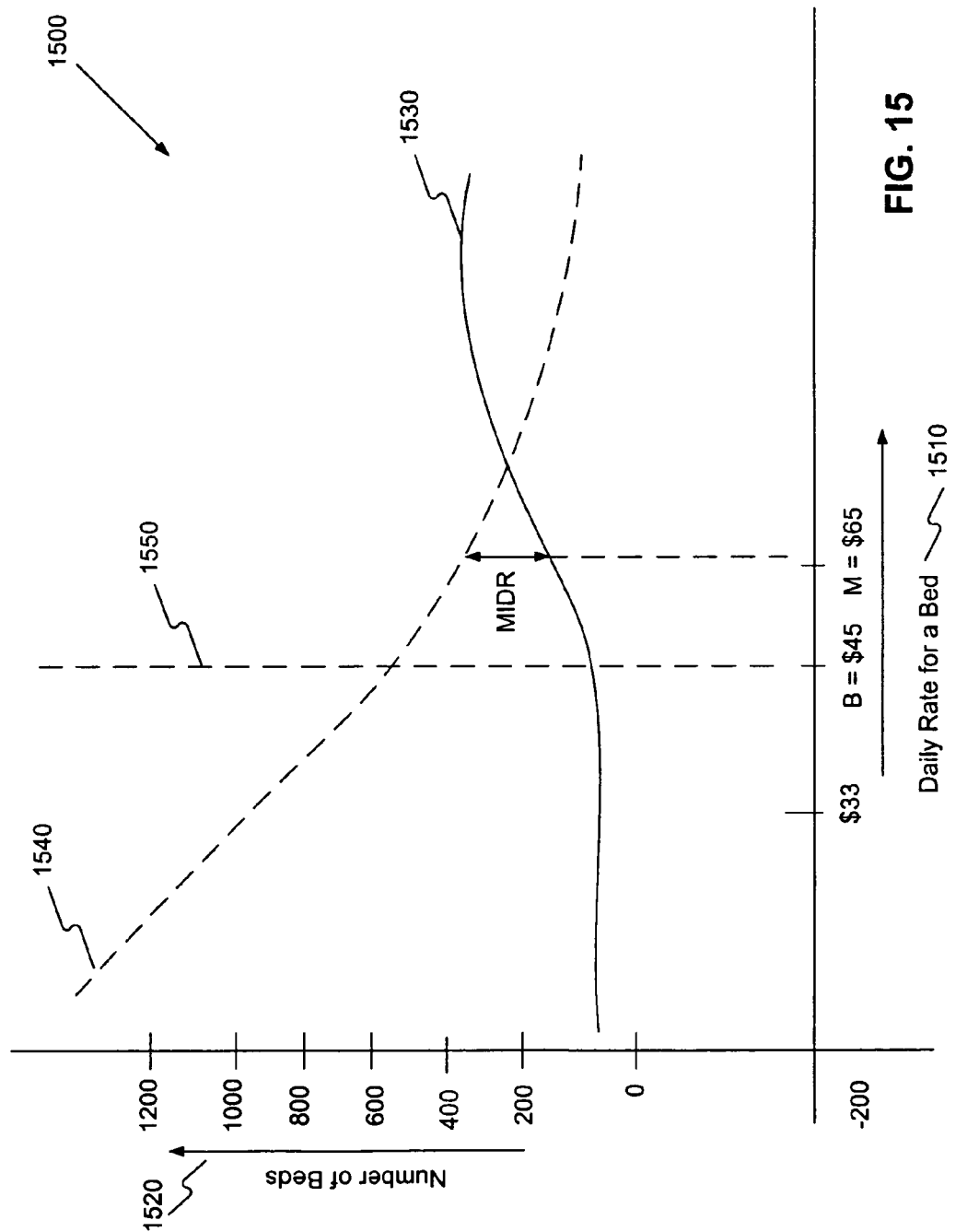
FIG. 15 is a graphical depiction of the variables corresponding to the net demand model, according to the present invention.

Having incorporated various aspects that may have an effect on supply or demand in a particular market area in a demand model, processing module 127 and the other system components may generate a set of variables corresponding to a net demand model as shown in FIG. 15. FIG. 14 depicts a flow chart corresponding to the process for generating the variables corresponding to the net demand model. First, a market area is defined, including the bands associated with the market area (step 1410). As discussed earlier, a market area may be defined using travel time or distance, and may be of any shape.

Processing module 127 then weights the bands (step 1420) based, for example, on travel time to or distance from the facility, as discussed earlier. The processing module next is used to generate and aggregate supply and demand data associated with the weighted bands. (step 1430). As part of this step, demand curve 1540 and supply curve 1530 may be generated. As discussed earlier, the demand curve or demand is generated by applying the demand model, for example, the model discussed with respect to FIGS. 12 and 13, to census or other data. The supply curve is an inventory of existing competition based on price. Weighting of the data (both supply and demand) may be combined in one step. Thus, for example, to determine the demand curve one may sum for each category of census data (age groups) the number of residents in the market area by calculating [(Weight for Band 1)*(Weight for Category A)*(Sum of all residents in Category A in Band 1)+(Weight for Band 2)*(Weight for Category A)*(Sum of all residents in Category A in Band 2) . . . (Weight for Band n)*(Weight for Category A)*(Sum of all residents in Category A in Band n)], where n=9 (assuming nine bands). One may similarly calculate the numbers for category B and so on and then add the demand to plot demand curve 1540. Similarly, using this process residents transferred from outside the market area may also be accounted for. One skilled in the art will appreciate that other methods may also be used to calculate empirically derived and weighted demand and supply.

Breakeven may be calculated by noting that it represents the point at which an assisted living facility at a standard level of occupancy (for example, 93%) will cover only its costs (fixed and variable), where the variable income is the income at a particular price point.

Next, using processing module 127 one may generate the variables corresponding to the net demand model (step 1440). As FIG. 15 shows, net demand model 1500 may include, in one analysis, variables such as supply, demand, net demand, price elasticity of demand, breakeven, and maximum initial daily rate (MIDR). FIG. 15 depicts, along x-axis, the daily rate price for a bed (1510), and, along the y-axis, the available beds of supply and the demand for them (1520). The variables shown in FIG. 15 correspond to senior housing, and relate to an assisted living facility; however, other variables might be used while analyzing retail industry, for example, determining the best location for a retail establishment.

Demand curve 1540 indicates demand at a particular price. Supply curve 1530 indicates supply at different price points. As one might expect, demand diminishes as price increases. The supply of beds increases as price increases. Net demand is the vertical distance (e.g., in beds) between the two curves at any price point. As shown in FIG. 15, for example, demand is quite high at low prices, close to 1000 beds at a daily rate of $33. Breakeven 1540 is indicated at a price point of $45. FIG. 15, also shows the maximum initial daily rate ("MIDR"), which may be derived in the following manner. Assume, for example, a developer wants to build a 100-bed facility. The price at which the supply and the demand curve are 100 beds apart corresponds to the maximum initial daily rate, which in this example is $65. One can plot these supply and demand curves using processing module 127 and a computer display connected to the processing module, as long as the module has stored the demand model and the data corresponding to a market area. Using the graphs and plot, one can then arrive at the different variables associated with the net demand model. In one embodiment consistent with the present invention, there are three input variables: supply curve, demand curve, and breakeven, and the other three variables: price elasticity of demand, net demand, and MIDR, may be derived from these three input variables.

As discussed above, another variable associated with the net demand model is the price elasticity of demand that corresponds to the rate at which the supply curve separates from the demand curve. The rate at which the curves separate provides the rate of expected response of the market to changes and price. Thus, once the values for the supply and demand curves are established, they are then band-weighted according to empirical research from within the market area and other variables associated with the net demand model are generated.

Consistent with the present invention, demand curve 1540 in FIG. 15 may be validated to ensure that it is an accurate representation of the demand at a particular facility or site. As discussed above, demand at a particular site or facility depends, among other things, on the age and income of the residents in the defined market area. These variables would typically influence the shape and tip (gradient) of the demand curve. As part of the validation step, one may gather data regarding the age and income of residents at entry to a facility within the defined market area. Then, one may compare the gathered information concerning the age and income of the residents with the values of these factors as used in the demand model. Also, the height of demand curve 1540 may also be verified or validated. This may be accomplished by several means. For example, the price elasticity of demand may be plotted for an existing facility in the defined market area and compared with the price elasticity of demand for a proposed facility or site by using data such as the degree of fill of facilities in the market area of the rate of replacement within the market area. Alternatively, a demand curve may be plotted for an existing facility in the defined market area and compared with the demand curve for a proposed facility. Also, as part of this process, the maximum initial daily rate associated with an existing facility may be compared with the maximum initial daily rate for the proposed facility and may be used to establish the vertical height of the demand curve. A process for comparing maximum initial daily rates is discussed in more detail below.

Other aspects of the demand model may also be verified similarly. Additionally, one may use known hypothesis testing methods to test the hypothesis generated from the above data. In other words, one may confirm or disconfirm a variable's distribution, for example, using statistical methods, such as Box-Jenkins, ANOVA, Factor Analysis, or Multiple Regression.

Having generated the six variables discussed above with respect to a net demand model, a comparison analysis may be performed. A comparison analysis may be used to compare two sites, for example, A and B, with a comparable third site, C that has already been completed and staffed, and that is operating at full occupancy. One can then use triangulation techniques on facility C for a reality check. Because comparison can include triangulation against existing facilities, which have already been filled, the absolute value of demand can be estimated more effectively than is possible with existing methods. Moreover, when comparing facilities using the net demand model, it may not be necessary to compute a confidence interval for the comparison because the model's assumptions for each site are the same.

Even with rigorous empirical techniques for defining the market area and for weighting the supply and demand within the market area, the task of determining total demand (the vertical height of the demand curve) is difficult. Traditional practice has been to estimate or guess at the value of total demand based on assumptions drawn from national or regional research, i.e., data from outside the market area. The use of the net demand model allows triangulation against a known existing facility that is fully leased and operating, and thus provides data from within the market area. To perform a comparison analysis one can either compare the net demand at each facility or one can compare the MIDR. In general, however, the comparison analysis discussed in this part of the description relates to comparing two sites A and B once the maximum initial daily rate corresponding to each one of the sites has been determined. As discussed earlier, however, sites may be compared based on net demand. In other words, comparing MIDR is a special case of comparing net demand, which can provide special insights that may not be available by simply comparing the net demand. Thus, assume that site A is offered for sale for $1 million and has a MIDR of $75 per day, and site B is offered for sale for $500,000 and has a MIDR of $65 per day. The MIDR associated with each one of the two sites allows a comparison that is much more rigorous than just a comparison of the sale prices of the two facilities. Thus, processing module 127 allows one to compute the capitalized value of a one dollar difference in the MIDR of the two using certain assumptions. For example, assuming for each site (1) a 93% occupancy rate; (2) 100 beds; and (3) a capitalization rate of 13%, one may use the following formula to arrive at the capitalized value of a one dollar difference in the MIDR of the two sites: ($1.00×365 days*93% occupancy×100 beds)/(13% capitalization rate). This formula reveals a capitalization value of $261,115, or approximately $250,000. Because, site A has a MIDR of $75 and site B has a MIDR of $65, site A is a better value despite being more expensive based on the net advantage. In this example, the net advantage is $2 million (taking into account the difference in the capitalized value of the two sites, i.e., $2.5 million and the difference between the asking price of the two sites, i.e., $0.5 million).

Figure 16:
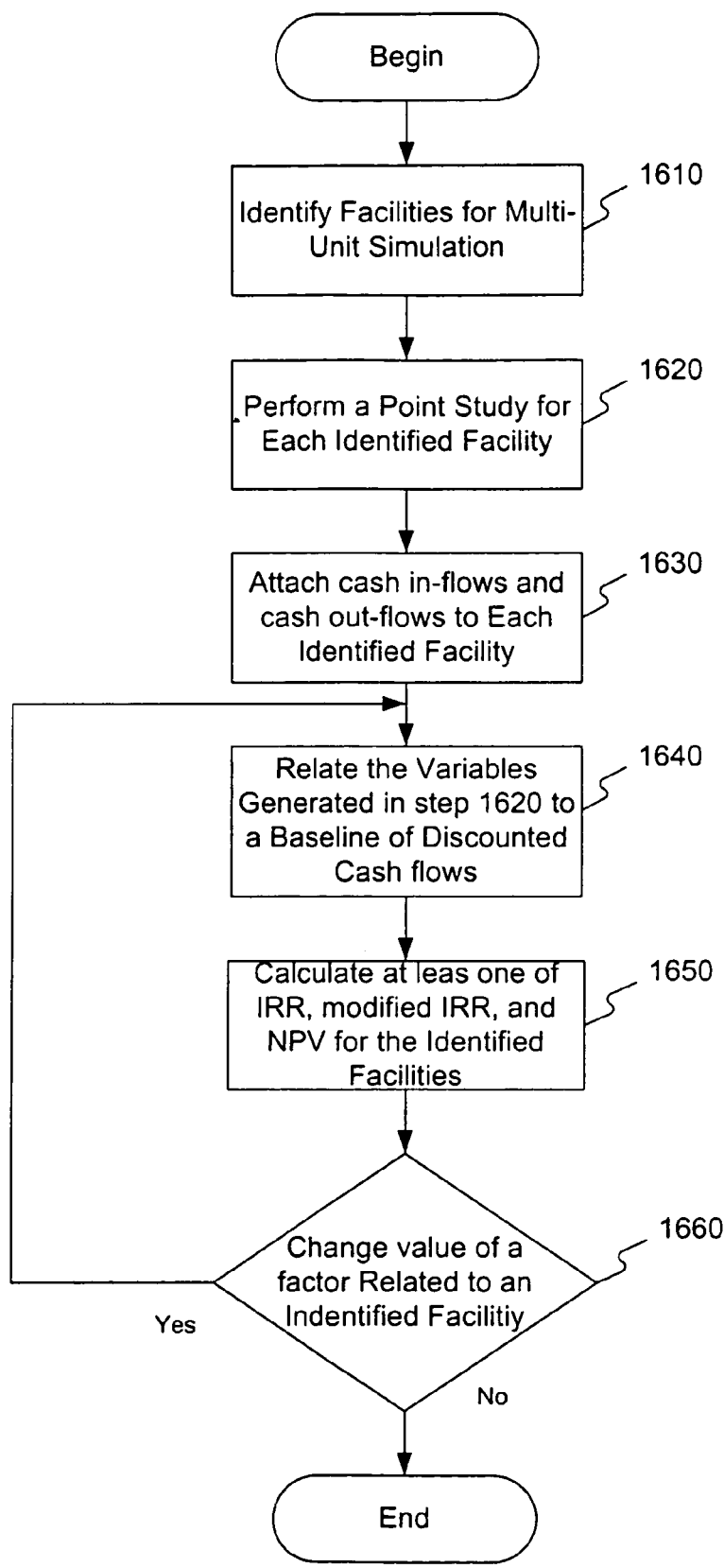
FIG. 16 is a flow chart of a process for performing a multi-unit simulation consistent with the present invention.

In another aspect consistent with the present invention, the system of FIG. 1 may be used to perform a multi-unit simulation, for example where a client wants to take over a chain of assisted living facilities. As shown in FIG. 16, the facilities that will be the subject of the analysis are identified (step 1610). Next, for each of the identified facilities, a point analysis is performed (step 1620). In some cases, a point analysis may be performed for each competing facility as well. As part of this step at least the six variables discussed earlier with respect to a net demand model are generated for each site that is a part of the chain. Additionally, each site is assigned a percentage fill variable, such that the changes in price of other facilities may be reflected through price elasticity of demand, to the percentage of fill and thus to the net income of the each facility. Next, cash inflows and cash outflows (i.e., financial pro forma) are attached to each identified facility (step 1630). The in/out cash flows expected from each of the facility that is being analyzed will depend on factors, such as the price of beds and enrollment. Next, the variables generated above are related to a baseline of discounted cash flows (step 1640).

Then, an internal rate of return ("IRR"), a modified internal rate of return ("modified IRR"), or a Net Present Value ("NPV") may be calculated for the multi-unit chain (step 1650). As part of this function, processing module 127 calculates a cumulative or summed financial pro form a for the entire chain or group of assisted living facilities that are part of the multi-unit simulation. Cash flows into and out of each one of the facilities may be stored, for example, in a table that processing module 127 can access. Using known techniques for calculating an internal rate of return, a modified rate of return, or a net present value, may be used for analyzing the facilities as an investment. For example, one may plot cash flows for the entire chain and then calculate the internal rate of return for the chain. By using processing module 127 and the aforementioned table or spreadsheet containing the cash flows, one may analyze the various permutations and combinations of the facilities. Also, one may change the values of factors, such as enrollment, and price associated with each facility to perform "what if" analysis (step 1660). Specifically, as part of this step, for example, one may try a series of ideas and compare the outcomes for each idea. For example, one may tie cash inflow from the sale of facility A to improvement of facility B (which would result in cash out for improvements and cash in from the higher rates); but the higher rates may result in lower demand at facility B and perhaps higher demand at nearby competing facilities, all of which may be captured in the net discounted cash flow.

The foregoing description provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

For example, although systems and methods consistent with the present invention are described as using block groups as the defined unit of measurement, one skilled in the art will appreciate that the present invention can be practiced using other units of measurement or definitions of map areas. Also, although systems and methods consistent with the present invention are described as using a primary, secondary, and tertiary market travel trace time, one skilled in the art will appreciate that the present invention can be practiced using fewer or greater numbers of travel time traces.

What is claimed is:

1. A computer-implemented method for selecting multiple sites using weighted bands, the method comprising:
 defining market areas corresponding to a plurality of sites within a geographic region, the market areas being associated with corresponding population data;
 establishing a plurality of bands for at least one of the market areas;
 weighting the plurality of bands according to a market-related factor, the step of weighting comprising weighting the population data associated with the market areas, and applying individual weights to the bands;
 applying a net demand model to the weighted bands, the step of applying comprising:
  obtaining supply and demand data for the bands based on the weighted population data associated with the market areas;
  adjusting the supply and demand data based on the individual weights applied to the bands; and
  generating, for at least one of the sites, values of parameters associated with the net demand model, based on at least the adjusted supply and demand data;
 assigning cash in-flows and cash out-flows to the at least one of the sites, the assignment being based on at least the generated values;
 calculating, using a processor, financial indicators for subsets of the sites, based on at least the assigned cash in-flows and cash out-flows; and
 selecting one of the subsets of sites based on at least the calculated financial indicators.

2. The method of claim 1, wherein the step of calculating the financial indicator comprises:
 calculating at least one of an internal rate of return for the subsets of the sites, a modified internal rate of return for the subsets of the sites, or a net present value for the subsets of the sites.

3. The method of claim 1, wherein the step of establishing comprises:
 establishing the plurality of bands for each of the market areas.

4. The method of claim 1, wherein:
 the step of generating comprises generating the values of the parameters associated for each of the sites; and
 the step of assigning comprises assigning the cash in-flows and the cash out-flows to each of the sites.

5. The method of claim 1, further comprising:
 clustering the plurality of bands to form a smaller number of bands,
 wherein the step of weighting comprises:
  weighting the smaller number of bands using weights that are empirically derived from data associated with the market areas.

6. The method of claim 1, further comprising:
 validating the financial indicators.

7. The method of claim 1, further comprising:
 relating the generated values of the parameters to a discounted cash flow, the discounted cash flow being based on the cash in-flows and cash out-flows assigned to the at least one of the sites.

8. The method of claim 1, further comprising:
 selecting the plurality of sites based on travel time or travel distance.

9. The method of claim 1, wherein the step of weighting the population data comprises:
 assigning weight factors to the population data based on one or more of age, disability, or housing value.

10. The method of claim 1, further comprising:
 deriving the individual weights for the plurality of bands from the population data associated with the market areas.

11. The method of claim 1, further comprising:
 deriving the individual weights for the plurality of bands from population data of a market area demographically similar to at least one of the defined market areas.

12. The method of claim 1, wherein the step of defining the market areas comprises:
 defining the market areas based on travel time or travel distance.

13. An apparatus, comprising:
 a processor for executing program instructions; and
 a memory storing the program instructions, the program instructions being executed by the processor to:
  define market areas corresponding to a plurality of sites within a geographic region, the market areas being associated with corresponding population data;
  establish a plurality of bands for at least one of the market areas;
  weight the plurality of bands according to a market-related factor, the program instructions being further executed to:
   weight the population data associated with the market areas; and apply individual weights to the bands;
apply a net demand model to the weighted bands, the program instructions being further executed to:
obtain supply and demand data for the bands based on the weighted population data associated with the market areas;
adjust the supply and demand data based on the individual weights applied to the bands; and
generate, for at least one of the sites, values of parameters associated with the net demand model, based on at least the adjusted supply and demand data;
assign cash in-flows and cash out-flows to the at least one of the sites, the assignment being based on at least the generated values;
calculate financial indicators for subsets of the sites, based on at least the assigned cash in-flows and cash out-flows; and
select one of the subsets of sites based on at least the calculated financial indicators.

14. A computer-readable medium storing instructions that are executed on a processor to perform a method for selecting multiple sites using weighted bands, the method comprising:
defining market areas corresponding to a plurality of sites within a geographic region, the market areas being associated with corresponding population data;
establishing a plurality of bands for at least one of the market areas;
weighting the plurality of bands according to a market-related factor, the step of weighting comprising weighting the population data associated with the market areas, and applying individual weights to the bands;
applying a net demand model to the weighted bands, the step of applying comprising:
obtaining supply and demand data for the bands based on the weighted population data associated with the market areas;
adjusting the supply and demand data based on the individual weights applied to the bands; and
generating, for at least one of the sites, values of parameters associated with the net demand model, based on at least the adjusted supply and demand data;
assigning cash in-flows and cash out-flows to the at least one of the sites, the assignment being based on at least the generated values;
calculating financial indicators for subsets of the sites, based on at least the assigned cash in-flows and cash out-flows; and
selecting one of the subsets of sites based on at least the calculated financial indicators.

* * * * *